Oct. 26, 1948.　　　　D. WARREN　　　　2,452,168
SWIVEL TYPE COAXIAL CONNECTOR
Filed March 1, 1945
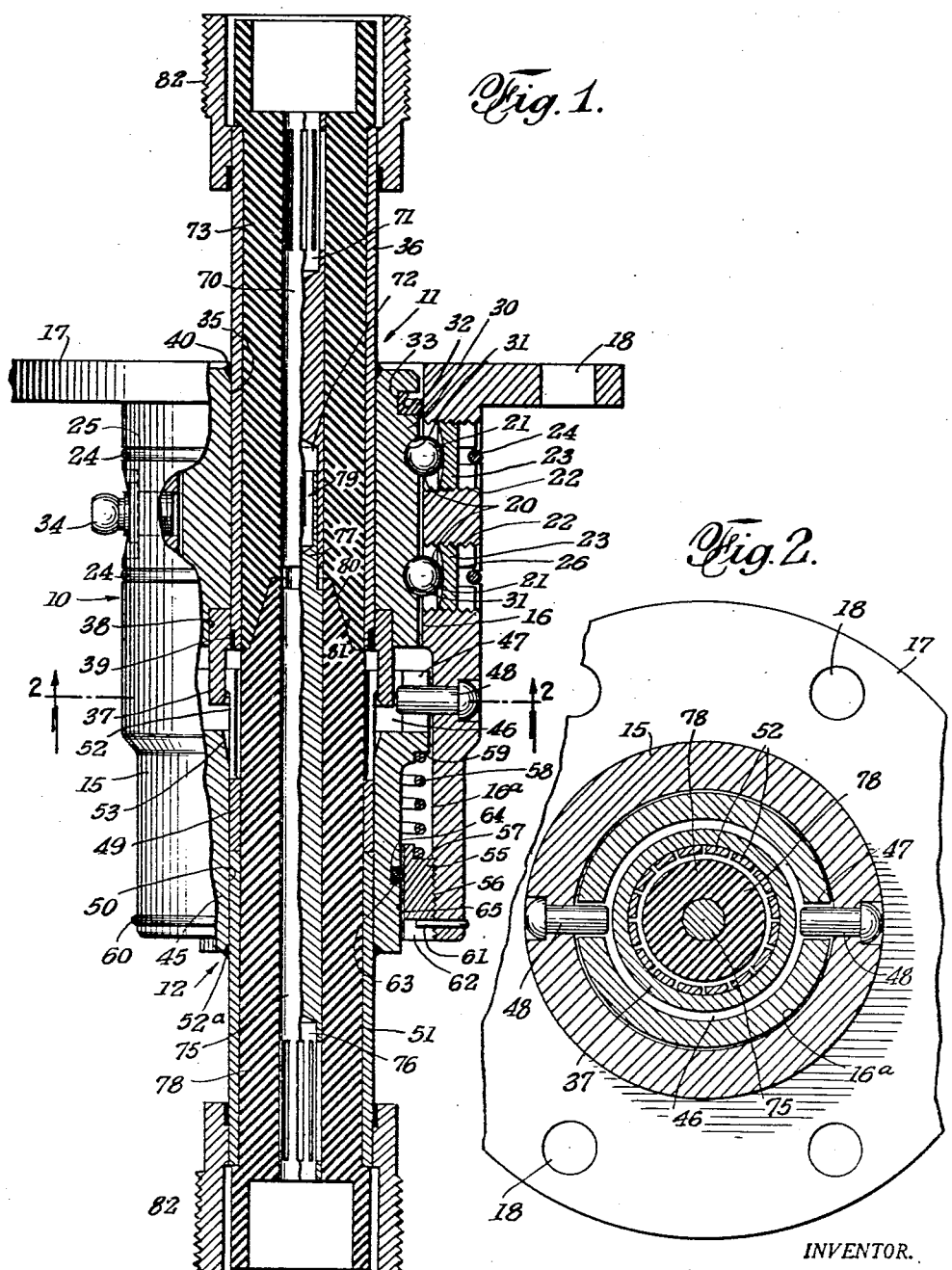
INVENTOR.
DOYLE WARREN
BY
ATTORNEY

UNITED STATES PATENT OFFICE 2,452,168

SWIVEL TYPE COAXIAL CONNECTOR

Doyle Warren, Monrovia, Calif., assignor to Chiksan Tool Company, Brea, Calif., a corporation of California Application March 1, 1945, Serial No. 580,390

6 Claims. (Cl. 173—324)

This invention relates to connectors for electrical conductors and relates more particularly to swivel type coaxial connectors.

An object of this invention is to provide a connector for coaxial cables or conductors which is practical, sturdy, and wear resistant.

Another object of the invention is to provide a connector of the indicated type which affords minimum resistance to relative rotation of the parts while maintaining firm, positive and dependable electrical engagement among the conductors thereof.

Another object resides in the provision of a coaxial swivel connector which incorporates features seeking to obviate inadvertent disassembly and affording connection and rotational features which are positive in function.

A further object of my invention is to provide a connector having a construction facilitating self-cleaning of the electrically engaged conductors thereof, whereby lubrication of said connectors will not affect the current transmitting properties thereof.

The various objects and features of my invention will be more fully understood from the following detailed description of a typical, preferred form and application of the invention, throughout which description reference is made to the accompanying drawings, in which:

Fig. 1 is a longitudinal sectional view of a connector in accordance with the present invention, portions thereof being shown in elevation, and Fig. 2 is a cross-sectional view as taken on the line 2—2 of Fig. 1.

In the embodiment of the invention illustrated in the drawing, the connector comprises, generally, a coupling 10 adapted to be held in fixed secured position, relatively rotational means or rotating element 11 longitudinally arranged in said coupling, and means 12 in the nature of an axially shiftable element in the coupling extending from the inner end of element 11 and adapted for axial or longitudinal movement with relation to both the coupling and the rotational element 11. The elements 11 and 12 are each preferably formed with portions extending outward from or beyond the coupling at opposite ends thereof, whereby connection of the present connector may be effected with cooperating parts, it being the purpose of the connector to conduct electric current from one of said cooperating parts to another in an efficient manner and with a minimum of potential drop therebetween.

The coupling 10 may comprise a body 15 of substantially cylindrical form and is preferably provided with a through axial bore 16. Means may be provided whereby said coupling may be mounted in a desired fixed position. Such means may comprise a flange 17, formed on the body, and said flange may have mounting holes 18. It is evident from this structure that said coupling may be mounted on a panel, wall, or other means and held thereon in fixed position, as by screws, rivets, and the like.

The bore of the body adjacent one end thereof, may be provided with a plurality of outer bearing races or grooves 20, suitably spaced axially, for bearing balls 21. Radial openings 22, which are preferably threaded, may be formed in said body, to afford access to the grooves for assembling the bearing balls therein. Threaded closure plugs 23 may be assembled in said openings to retain the bearing balls, and, finally, means such as lock wires 24 may be provided for preventing working of said closure plugs, said wires being arranged to encircle the body, as in grooves 25, and engage with slots 26 in said closure plugs.

The rotational means or element 11 preferably includes a sleeve or nipple 30 which is located in bore 16 and is provided in its exterior with annular grooves 31 affording inner bearing races aligned with the races 20 of the body, whereby said means 11 is mounted for frictionless rotation in the body and whereby relative axial or longitudinal movement is limited to that incidental to working clearance.

Between the outermost of the bearing races and the end of the nipple 30 adjacent thereto means, such as a packing seal 32, may be provided, said seal preferably being carried in an annular groove 33 in the nipple and having sealing engagement with the bore 16 of the body 15. Said seal 32 serves to retain lubricating material, such as grease, which is provided for the bearings of the connector. The grease may be inserted as through a fitting 34 carried by the body and disposed between the bearing races.

The nipple 30 of the rotational means 11 may be formed with a central axial bore 35 and in said bore there is preferably mounted a tubular member 36 which extends through the nipple 30 and protrudes therefrom, and from the body 15 shown as having the mounting flange 17.

Bearing and contact means may be provided on the rotational means or element 11 disposed within the coupling 10. Such means may comprise a bearing ring 37 which may be engaged in a seat 38 provided in the nipple 30 and which is preferably connected as by solder 39 to the inner end of tubular member 36. The outer end of the nipple 30 and the tubular member 36 also may be connected as by solder 40. From this structure it may be seen that not only are the elements of the rotational means 11 firmly assembled, but that a good electrical path from the bearing ring 37 to and through the tubular member 36 is provided.

In the remaining portion of the bore 16, and preferably in an enlargement 16ᵃ thereof, there may be disposed an axially arranged sleeve 45, said sleeve comprising a part of the axially movable means or element 12. Said sleeve, at its end adjacent the bearing ring 37, may be annularly grooved as at 46 for reception of the projecting portion of the bearing ring, and the portion of the sleeve which is thus grooved may be provided with a radial slot or slots 47 for reception of a pin or pins 48 carried by the body 15 to project inwardly from the bore 16a and into the slots. The slots 47 may be of such longitudinal extent as to permit limited axial movement of the sleeve 45, and, therefore, of the elements carried thereby. Said elements may include parts such as a contact ring 49 disposed in one end of an axial bore 50 in the sleeve 45, and a tubular member 51 somewhat similar to the tubular member 36 arranged in the outer end of bore 50. The member 51 may project from the outer end of sleeve 45 and may be connected to the sleeve 45, as by solder 52a.

The contact ring 49 is preferably arranged for contact engagement with the inner surface of the bearing ring 37 and is preferably formed in its end which is within the ring 37 with a plurality of radial end slots to provide a plurality of contact fingers 52 having their outer sides finished to afford the desired contact engagement with the bearing ring 37. Freedom of movement of the fingers 52 is afforded by relieving the sleeve bore 50, as at 53.

The bore 16a is preferably open ended to allow for insertion thereinto of the axially movable element 12. Element 12 may be retained in the bore 16a through the medium of a retaining nut 55, threadedly engaged, as at 56, with the body 15, and serving to provide an abutment 57 for a coil spring 58 having its other end in engagement with the sleeve 45 as at 59 to normally yieldingly urge the element 12 in or toward element 11.

It is evident from the above that the spring 58 will at all times hold the contact fingers 52 in position for engagement with the bearing ring 37 and will hold sleeve 45 in position where the slots 47 are engaged by the pins 48.

Means may be provided to prevent backing off of the retainer nut 55 and may comprise a wire 60 encircling the body 15 and formed with at least one inreaching radial portion 61 engaged in at least one of several slots 62 formed in the end of said retainer nut. The grease seal for the connector may be completed on the end of the connector housing, the axially movable element 12. Such a seal may comprise a grease retaining ring 63 in an annular groove 64 in the sleeve 45 and having sealing contact with the longitudinal bore 65 of the retainer nut 55.

The rotational element 11 and the axially movable element 12, are disposed in aligned relation and extend from each end of the coupling 10. As contemplated, the element 11 may be provided with an axial contact in the form of a rod 70 formed at its outer end with a seat 71 for the insertion of a conductor, or the like, of a part having cooperative connection with the present connector. The rod, at its inner end, may be formed with a seat 72 rendering said rod functionable as a female contact member. Said rod is held centrally in the tubular member 36 by a dielectric liner 73 serving to insulate the rod and tubular member from each other. Element 12 may be provided with an axial contact rod 75 having a seat 76 in its outer end for the insertion of a conductor of another cooperative connection. The rod 75, at its inner end 77, may be reduced in diameter to function as a male contact member fitting the seat 72. Said rod 75 is held centrally in the tubular member 51 as by a dielectric liner 78. The contact end 77 of the rod 75 preferably projects beyond the end of the dielectric liner 78 and into the seat 72 of the rod 70. Firm, sure electric engagement of the contact rods 70 and 75 may be insured by slitting the rod end 77 as at 79 to form finger contacts which bear outward in the seat 72 to have firm engagement with the wall of the seat.

In order to insure proper alignment of the elements 11 and 12, the insulating liner 73 may be formed with a tapered seat 80 and the liner 78 with a tapered plug end 81 which enters the seat. The engagement of plug 81 in seat 80 limits the endwise movement of the element 12 under urgency of the spring 58.

In a suitable manner, elements 11 and 12 may be provided with coupling, nipple or seal retainer means 82 for making the desired mechanical connection with parts to be connected to the present connector.

From the foregoing description it will be apparent that a connector realizing the objects of the invention has been provided; that an efficient outer conductor or shield has been provided for an axial electrical conduction means; that both shield and axial conductor, while separable, are interconnected in a manner to obviate potential drop therebetween; that the rotational portions of the shield and axial conductor may rotate or swivel without affecting the current carrying efficiency of the connector; and that simple and efficient and compact means have been provided to facilitate such rotation and to obviate undue binding of the parts. The connector is capable of quick and easy assembly and is designed for minimum wear of the working parts.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In a device of the character described, a coupling element having a longitudinal bore extending through it, a rotational element entering the coupling from one end and including a sleeve fitting the bore and a coupling part at the exterior of the coupling element, an annular row of ball bearings mounting the sleeve in the bore for rotation without axial movement, a rigid axially shiftable element entering the coupling from the other end and including a coupling part at the exterior of the coupling element and a sleeve fitting the bore, a part projecting from the coupling element into the bore and engaging the last mentioned sleeve holding it against rotation in the coupling, the rotational element having a central bearing ring projecting from its inner end and the axially shiftable element having a plurality of longitudinally disposed contact fingers projecting from its inner end and bearing in the ring, and means normally yieldingly urging the axially shiftable element inwardly in the coupling.

2. In a device of the character described, a coupling element having a longitudinal bore extending through it, a rotational element entering the coupling from one end and including a coupling part at the coupling element and a sleeve fitting the bore, an annular row of ball bearings mounting the sleeve in the bore for rotation without axial movement, a rigid axially shiftable element entering the coupling element from the other end and including a coupling part at the exterior of the coupling element and a sleeve fitting the bore, a part projecting from the coupling element into the bore and engaging the last mentioned sleeve holding it against rotation in the coupling, the rotational element having a central bearing ring projecting from its inner end and the axially shiftable element having a plurality of longitudinally disposed contact fingers projecting from its inner end and bearing in the ring, means within the coupling element normally yieldingly urging the axially shiftable element inwardly in the coupling, and packing means between the rotational element and the coupling outward of the ball bearings and between the axially shiftable element and the coupling outward of said means.

3. In a device of the character described, a coupling having a longitudinal bore extending through it, a rotational element entering the coupling from one end and including a sleeve fitting the bore, an annular row of ball bearings mounting the sleeve in the bore for rotation without axial movement, a rigid axially shiftable element entering the coupling from the other end and including a sleeve fitting the bore, a part projecting from the coupling into the bore and engaging the last mentioned sleeve holding it against rotation in the coupling, the rotational element having a central bearing ring projecting from its inner end and the axially shiftable element having a plurality of longitudinally disposed contact fingers projecting from its inner end and bearing in the ring, means normally yieldingly urging the axially shiftable element inwardly in the coupling including a spring surrounding the last mentioned sleeve and a ring mounted in the end of the bore supporting one end of the spring with the other end of the spring bearing on said last mentioned sleeve, and packing means between the sleeve of the rotational element and the bore of the coupling and between the sleeve of the axially movable element and the said ring, the rotational element and the axially shiftable element having outer end portions projecting from the ends of the coupling.

4. In a device of the character described, a coupling having a longitudinal bore extending through it, a rotational element entering the coupling from one end and including a sleeve fitting the bore, an annular row of ball bearings mounting the sleeve in the bore for rotation without axial movement, an axially shiftable element entering the coupling from the other end and including a sleeve fitting the bore, a part projecting from the coupling into the bore and engaging the last mentioned sleeve holding it against rotation in the coupling, the rotational element having a central bearing ring projecting from its inner end and the axially shiftable element having a plurality of longitudinally disposed contact fingers projecting from its inner end and bearing in the ring, and means normally yieldingly urging the axially shiftable element inwardly in the coupling, each of said elements including a dielectric liner carrying a contact, one liner having a central tapered plug on its inner end and the other liner having a central socket receiving the plug, the contacts carried by the liners being engaged when the plug is engaged in the socket.

5. In a device of the character described, a coupling having a longitudinal bore extending through it, a rotational element entering the coupling from one end and including a sleeve fitting the bore, an annular row of ball bearings mounting the sleeve in the bore for rotation without axial movement, a rigid axially shiftable element entering the coupling from the other end and including a sleeve fitting the bore, a part projecting from the coupling into the bore and engaging the last mentioned sleeve holding it against rotation in the coupling, the rotational element having a central bearing ring projecting from its inner end and the axially shiftable element having a plurality of longitudinally disposed contact fingers projecting from its inner end and bearing in the ring, and means normally yieldingly urging the axially shiftable element inwardly in the coupling, the sleeve of the axially shiftable element having an inner end portion overlying the said ring and having a longitudinal slot receiving said part, the rotational element and the axially shiftable element having outer end portions projecting from the ends of the coupling.

6. In a device of the character described, an elongated coupling having a central longitudinal bore enlarged at one end, a rotational element entering the bore of the coupling from its small end and including a sleeve fitting the bore, longitudinally spaced annular series of ball bearings mounting the sleeve for rotation without axial movement, an axially shiftable element entering the bore from its enlarged end and including a sleeve in the bore, a ring detachably mounted in the outer end portion of the enlarged end of the bore, a helical compression spring surrounding the last mentioned sleeve and acting between said sleeve and the ring to normally yieldingly urge the axially shiftable element inward in the coupling, a central bearing ring projecting from the inner end of the sleeve of the rotational element, a plurality of spring contact fingers projecting from the inner end of the sleeve of the axially shiftable element and bearing in said bearing ring, the sleeve of the axially shiftable member having a part projecting from its inner end to overlie the bearing ring which part has a longitudinal slot therein, a projection carried by the coupling to extend into the bore thereof and enter the said slot to confine the axially shiftable member to axial movement relative to the coupling, each of said elements having a dielectric liner, the inner end of one liner having a tapered plug projecting therefrom engaging in a socket in the inner end of the other liner, contacts centrally carried by the liners for making an electrical connection through the device, one contact having a socket in its inner end and the other contact having a reduced end portion with contact fingers thereon bearing in the last mentioned socket, and packing between the sleeve of the rotational element and the small portion of the bore of the coupling outward of the ball bearings and between the sleeve of the axially shiftable element and the ring mounted in the enlarged bore of the coupling, there being a passage in the coupling to admit lubricant to the bore of the coupling between the said packings.

DOYLE WARREN.

REFERENCES CITED

The following references are of record in the file of this patent:

UNITED STATES PATENTS

| Number | Name | Date |
| --- | --- | --- |
| 1,070,307 | Twining | Aug. 12, 1913 |
| 1,098,291 | Oakes | May 26, 1914 |
| 1,176,554 | Herzig | Mar. 21, 1916 |
| 1,433,331 | Augstrom | Oct. 24, 1922 |
| 1,574,211 | Taylor | Feb. 23, 1926 |
| 1,657,306 | Gursky | Jan. 24, 1928 |
| 2,365,048 | Bruno | Dec. 12, 1944 |